United States Patent [19]

Brenneman

[11] 4,415,312
[45] Nov. 15, 1983

[54] TRANSVERSE AXIS FLUID TURBINE

[75] Inventor: Ben Brenneman, Lynchburg, Va.

[73] Assignee: Wixlin, Inc., Lynchburg, Va.

[21] Appl. No.: 356,944

[22] Filed: Mar. 11, 1982

[51] Int. Cl.$^3$ .............................................. F03D 7/06
[52] U.S. Cl. ................................. 416/119; 416/132 B; 416/139
[58] Field of Search ................ 416/119, 139 A, 132 B

[56] References Cited

U.S. PATENT DOCUMENTS

| | | | |
|---|---|---|---|
| 1,835,018 | 12/1931 | Darrieus | 416/178 X |
| 4,052,134 | 1/1976 | Rumsey | 416/119 |
| 4,082,479 | 4/1978 | Rangi et al. | 416/23 |
| 4,105,363 | 8/1978 | Loth | 416/41 |
| 4,137,009 | 1/1979 | Telford | 416/24 |
| 4,142,822 | 3/1979 | Herbert et al. | 415/2 |
| 4,180,367 | 12/1979 | Drees | 416/119 |
| 4,247,252 | 1/1981 | Seki et al. | 416/44 |
| 4,247,253 | 1/1981 | Seki et al. | 416/44 |
| 4,248,568 | 2/1981 | Lechner | 416/132 B |
| 4,255,085 | 3/1981 | Evans | 416/197 A |
| 4,264,279 | 4/1981 | Dereng | 416/227 A |
| 4,285,636 | 8/1981 | Kato et al. | 416/197 A |
| 4,293,279 | 10/1981 | Bolie | 416/227 A |
| 4,368,392 | 1/1983 | Drees | 416/119 X |

FOREIGN PATENT DOCUMENTS 2481756 11/1981 France ................................ 416/17

*Primary Examiner*—Everette A. Powell, Jr.
*Attorney, Agent, or Firm*—Charles J. Long; Charles M. Leedom, Jr.

[57] ABSTRACT

A fluid turbine, the rotation axis of which is transverse to the direction of fluid flow, has at least two blade assemblies mounted for rotation about the rotation axis. Each blade assembly includes a streamlined elongated blade having a span parallel to the rotation axis. Each blade is pivotable about a pivot axis parallel to and spaced from the rotation axis. The pivot axis is located circumferentially ahead of the blade center of pressure with respect to the direction of turbine rotation. Each blade assembly is so constructed that its center of mass is located either at its pivot axis or circumferentially at its pivot axis and radially outboard of its pivot axis.

12 Claims, 4 Drawing Figures

TRANSVERSE AXIS FLUID TURBINE

BACKGROUND OF THE INVENTION

1. Field of the Invention

This invention relates to fluid turbines. More particularly, it relates to fluid turbines having rotation axes transverse to the direction of fluid flow, in which dynamic forces acting on the blades are utilized to control the turbine behavior.

2. Description of the Prior Art

Little progress has been made in the design of transverse axis turbines since the original Darrieus Patent, U.S. Pat. No. 1,835,018, was filed in 1926. Both types of the Darrieus turbine (fixed blades, and pivoted blades positioned and operated by a cam) have limitations which have prevented their widespread use. The fixed blade type, while simple and insensitive to fluid flow direction, has such a low starting torque that some external torque must usually be supplied to achieve operating speed. The pivoted blade type, sometimes referred to as a cyclogiro, has better starting characteristics but is mechanically much more complex due to the linkages and cam used to control the blade pivot angles. Additionally, the pivoted blade type does not have the important characteristic of insensitivity to fluid flow direction, since the cam must be properly oriented with respect to such direction. The pivoted blade type also has a relatively narrow operating range of tip speed ratios (Tip Speed Ratio=Circumferential Tip Velocity/Wind Velocity). Finally, neither of the two types possesses any inherent overspeed protection.

Some prior attempts to improve transverse axis turbines have involved complex servo mechanisms to orient the blades, prevent overspeeding, and/or assist in initiating rotation. Examples of such attempts can be found in the following listed U.S. patents:

U.S. Pat. No. 4,082,479 Rangi et al.
U.S. Pat. No. 4,105,363 Loth
U.S. Pat. No. 4,137,009 Telford
U.S. Pat. No. 4,247,252 Seki et al.
U.S. Pat. No. 4,247,253 Seki et al.

Other attempts involve modification of airfoil shapes to improve starting and other characteristics, as evidenced by Dereng U.S. Pat. No. 4,264,279, Kato et. al U.S. Pat. No. 4,285,636 and Bolie U.S. Pat. No. 4,293,279. Still other prior art transverse axis turbines include such features as blades formed from sail cloth or the like (Lechner U.S. Pat. No. 4,248,568), flow augmenting members attached to the ends of conventional airfoil blades (Evans U.S. Pat. No. 4,255,085) and an outer cage surrounding the rotating blades and serving to channel the air stream to the blades (Herbert et. al U.S. Pat. No. 4,142,822).

In general, prior art transverse axis turbines of which I am aware are not completely satisfactory because they are either inefficient, costly or complex to build and maintain.

SUMMARY OF THE INVENTION

I have discovered that the dynamic forces acting on the blades of a transverse axis fluid turbine can be utilized to control the turbine's behavior by the use of either of two relatively simple designs which I call the "elastic" and the "inertial" types respectively.

In accordance with the invention, I provide as the elastic type, a fluid turbine comprising a rotation axis transverse to the direction of fluid flow, at least two blade assemblies spaced from and mounted for balanced rotation about the rotation axis, each blade assembly including an elongated blade having a streamlined cross-section and a span parallel to the rotation axis, each blade assembly being pivotable about a pivot axis which is parallel to and spaced from the rotation axis, each blade assembly being so constructed and positioned that the chord of its blade lies along a line which intersects the assembly's pivot axis and is perpendicular to a radius from the rotation axis to the pivot axis when the assembly is undisturbed, characterized in that the pivot axis of each blade assembly is located circumferentially ahead of the center of pressure of the blade with respect to the direction of turbine rotation, each blade assembly is so contructed that its center of mass is located at its pivot axis, and each blade assembly includes elastic means which tend to return the assembly to its undisturbed position whenever fluid or inertial forces cause it to pivot away from such position, the elastic means having stiffness characteristics such that reverse flow of fluid over the blade creates an unstable condition at a predetermined minimum fluid velocity at which turbine rotation is to begin, the blade assembly having a natural frequency about its pivot axis in cycles per second equal to a predetermined maximum permissible rotational speed of the turbine in revolutions per second. Preferably this type includes means limiting the angular pivotal deflection of each blade assembly to a predetermined angle, no greater than 90 degrees and preferably no greater than 45 degrees, from its undisturbed position.

In the inertial type, I provide a fluid turbine comprising a rotation axis transverse to the direction of fluid flow, at least two blade assemblies spaced from and mounted for balanced rotation about the rotation axis, each blade assembly including an elongated blade having a streamlined cross-section and a span parallel to the rotation axis, each blade assembly being pivotable about a pivot axis which is parallel to and spaced from the rotation axis, each blade assembly being so constructed and positioned that the chord of its blade lies along a line which intersects the assembly's pivot axis and is perpendicular to a radius from the rotation axis to the pivot axis when the assembly is undisturbed, characterized in that the pivot axis of each blade assembly is located circumferentially ahead of the center of pressure of the blade with respect to the direction of turbine rotation, each blade assembly is so constructed that its center of mass is located circumferentially at its pivot axis and radially outboard of its pivot axis by a distance substantially less than the distance from the rotation axis to the pivot axis but not less than about $(rg)^2/R$ where (rg) is the radius of gyration of the blade assembly about its center of mass and R is the distance from the rotation axis to the pivot axis, and means are provided limiting the angular pivotal deflection of each blade assembly to a predetermined angle, no greater than 90 degrees and preferably no greater than 45 degrees, from its undisturbed position.

I may combine the elastic and inertial types by including with the inertial type elastic means which tend to return each blade assembly to its undisturbed position whenever fluid or inertial forces cause the blade assembly to pivot away from such position, the elastic means having stiffness characteristics such that reverse flow of fluid over a blade creates an unstable condition at a predetermined minimum fluid velocity at which turbine rotation is to begin.

In preferred embodiments the cross-section of each blade is an airfoil. In further preferred embodiments the airfoil is symmetrical with respect to its chord.

Advantageously each blade has a ratio of span to chord length of about 12 to 1 and a ratio of thickness to chord length of about 1 to 8.

In a useful embodiment the distance from the rotation axis to the pivot axis of each blade assembly is about 7.5 times the chord length of the blade.

In other useful embodiments the cross-section of each blade is a hydrofoil, preferably one which is symmetrical with respect to its chord.

In an especially preferred embodiment, the pivot axis of each blade assembly is located a short distance ahead of the blade's leading edge with respect to the direction of turbine rotation.

It will be understood that by "span" I mean the overall length of a blade and by "chord" I means a straight line between the blade's leading edge and its trailing edge.

BRIEF DESCRIPTION OF THE DRAWINGS

In the accompanying drawings I have shown certain present preferred embodiments of the invention in which.

DESCRIPTION OF THE PREFERRED EMBODIMENTS

Although turbines according to the invention can be used in various fluid media, including air and water, their principal use is intended to be as wind turbines. Consequently, the following description and discussion deal particularly with wind turbines according to the invention.

Figure 1:
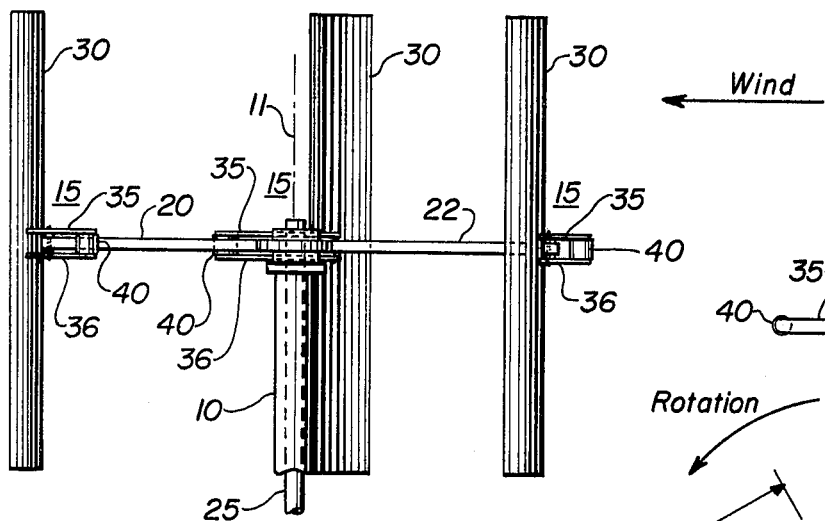
FIG. 1 is a front elevational view of a three-blade elastic type turbine according to the invention.
Figure 2:
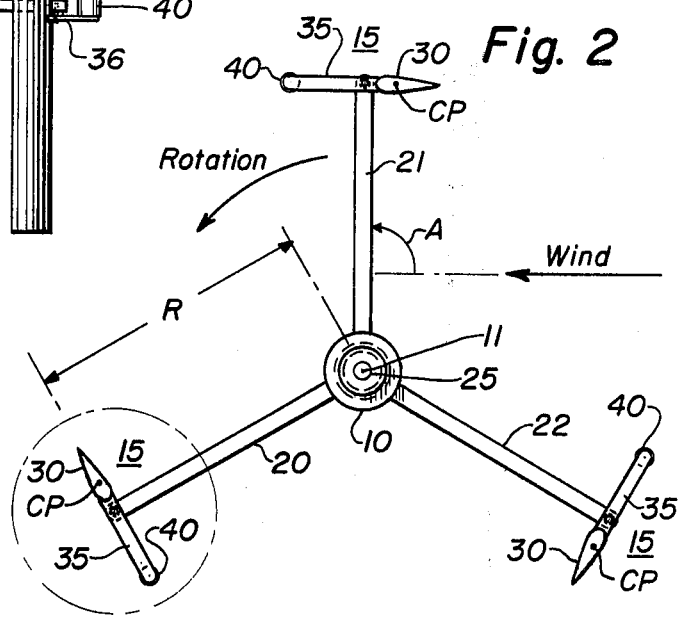
FIG. 2 is a plan view of the turbine of FIG. 1.

Turning first to FIGS. 1 and 2, there is shown a three-blade elastic type wind turbine according to the invention. A generally vertical housing 10 is fixed at its lower end, not shown, to a suitable base, which may be the earth. Housing 10 may be of any suitable size and material. A generally vertical shaft 25 is mounted for free rotation in housing 10. Since the wind direction is generally horizontal, as indicated by the arrow in FIG. 1, the vertical axis of shaft 25 defines a rotation axis 11 transverse to the direction of air flow. Suitable bearings or the like may be used to minimize friction, as will be evident to those skilled in the art, and the shaft may be coupled to drive means (not shown) for a generator or the like. Attached to the shaft are three horizontal support arms 20, 21 and 22, the outer ends of which support three blade assemblies. The blade assemblies in the embodiment of FIGS. 1 and 2 are identical in size, weight and design; consequently, each is designated generally by the numeral 15 and like parts of each carry the same identifying numerals. The support arms and corresponding blade assemblies are equally spaced around shaft 25 to provide for balanced rotation of the turbine. Note that FIGS. 1 and 2 depict one support arm for each blade, attached to the blade at about its mid-point; in some instances, structural considerations may dictate that additional support arms be spaced along the span of each blade, and such arrangements are within the scope of the invention.

One blade assembly will now be described, it being understood that such description applies to each of the three assemblies shown in FIGS. 1 and 2.

The blade assembly includes an elongated blade 30 which is an airfoil symmetrical with respect to its chord. The ratio of span to chord length is 12 to 1 in blade 30 and the ratio of thickness to chord length is 1 to 8, although the blade thickness is exaggerated for clarity in the drawing figures. I have found that these ratios are satisfactory for operation of my turbine.

Extending from the mid-point of the leading edge of blade 30 and perpendicular to the span thereof are two parallel support members 35 and 36, the ends of which are affixed to a counterweight 40; the weight and position of counterweight 40 are selected so as to locate the center of mass of the blade assembly at pivot axis 45, discussed below, when the assembly is in place on the support arm 20, 21 or 22, as the case may be.

Figure 3:
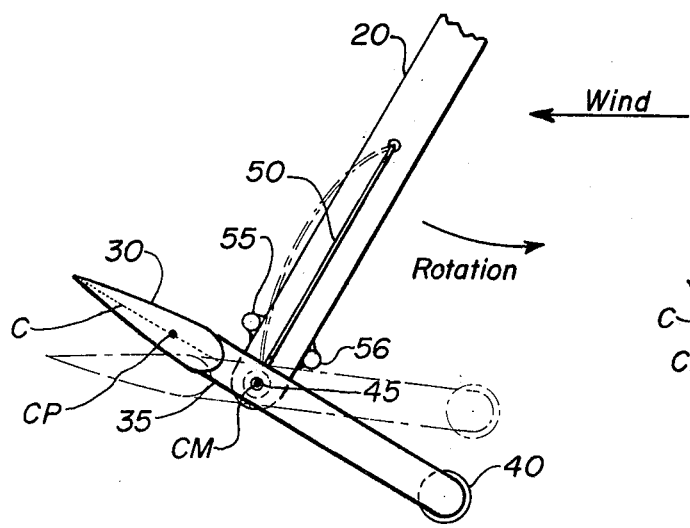
FIG. 3 is a detail view of the portion of FIG. 2 enclosed in the broken circle.

Referring to FIG. 3, there is shown a blade assembly for an elastic type turbine according to the invention. In this assembly, the chord of blade 30 is shown as dashed line C, the center of pressure of the blade as point CP, and the center of mass of the blade assembly as point CM. Although point CP will fall along the chord of a symmetrical airfoil such as blade 30, and point CM will be along the lateral midline of a uniform and symmetrical assembly such as shown in FIG. 3, it should be understood that the locations shown in FIG. 3 for the points CP and CM are not necessarily precise, but represent approximations used for illustrative purposes. Precise location of the center of pressure of an airfoil and center of mass of an assembly such as the blade assembly is readily accomplished in practice according to principles well known in the art.

The blade assembly of FIG. 3 is mounted on support arm 20 so as to be pivotable about a pivot axis 45 which is spaced from and parallel to the rotation axis 11—i.e., the pivot axis is generally vertical. It will be understood that as so mounted the span of blade 30 is parallel to rotation axis 11. The assembly is so constructed and oriented that the chord of blade 30 lies along a line which intersects pivot axis 45 and is perpendicular to a radius joining pivot axis 45 to rotation axis 11 when the assembly is undisturbed. The distance from rotation axis to pivot axis, R in FIG. 2, is about 7.5 times the chord length of the blade in the embodiment shown.

With further regard to the relationship between pivot axis 45 and the blade assembly, the following two features are critical to the proper operation of my turbine: first, pivot axis 45 is located circumferentially ahead of the center of pressure of blade 30 with respect to the direction of turbine rotation; I prefer the relationship illustrated in the figures, wherein the pivot axis is located a short distance ahead of the blade's leading edge with respect to the turbine rotation direction. Once having located the pivot axis, the second critical feature is that the blade assembly be so balanced that its center of mass CM coincides with the pivot axis 45; typically, such balance is achieved by suitable adjustment and location of the counterweight 40.

In the elastic type turbine shown in FIG. 3, the blade assembly includes elastic means, which in FIG. 3 is a steel rod or wire spring 50 but may be any suitable elastic means fulfilling the requirements to be discussed.

The spring 50 is affixed at one end to the blade assembly and at the other end to radial support arm 20 in such manner that it tends to maintain the blade assembly in its undisturbed position. The stiffness characteristics of spring 50 or other elastic means must be selected so that (a) reverse flow of air over blade 30 (i.e., air flow from trailing edge to leading edge of the blade) creates an unstable condition (i.e., causes the blade assembly to pivot away from its undisturbed position) when the wind velocity rises above a predetermined minimum at which turbine rotation is to begin, and (b) the natural frequency, in cycles per second, of the blade assembly about the pivot axis 45 is equal to the turbine rotational speed, in revolutions per second, which is decided upon as the maximum permissible for the conditions under which the turbine is to be used.

Finally with respect to the portion of the turbine shown in FIG. 3, pins 55 and 56 attached to support arm 20 serve as means to limit the angular pivotal deflection of the blade assembly from its undisturbed position; means other than pins can of course also be used satisfactorily. Generally, I prefer that such limiting means restrict pivotal deflection of the blade assembly to an angle of 45 degrees or less in either direction from the undisturbed position; broadly, however, deflection may be limited to an angle no greater than 90 degrees from the undisturbed position. FIG. 3 shows in broken lines the blade assembly pivoted against one of the limiting pins. It will be understood that the limiting means when used with the elastic type turbin serve merely to prevent excessive deflection, and possible loss of elastic properties, of the spring 50 or other elastic means.

The equations of motion for the elastic turbine as above described are a pair of coupled, nonlinear, ordinary differential equations of second order. Solution of these equations indicates that an elastic type turbine according to the invention is both self-starting and self-limiting with respect to its maximum rotation speed regardless of the load on the turbine or the velocity of the air or other fluid. A brief explanation of the reasons for these advantageous features follows.

Initially, a wind velocity in excess of the above discussed minimum needed for starting and a wind direction as shown in FIG. 2 are assumed. For tip speed ratios less than one, when the angle between a radial support arm and the wind, angle A in FIG. 2, is between 0 and 180 degrees, the blade at the end of that arm has reversed flow over its surface and tends to unfeather, thus maximizing the positive torque delivered to the turbine shaft 25. When the angle A is between 180 degrees and 360 degrees, the blade tends to feather, thus minimizing the negative torque delivered to the turbine shaft. With the angle A at or near 0 and 180 degrees, the blade deflects as during normal operation, delivering positive torque to the shaft. These factors cause high net starting torques and result in self-starting characteristics for this turbine type.

The explanation for the self-limiting feature of elastic type turbines according to the invention can best be expressed in differential equation language. When the forcing function frequency, which is equal to the rotational speed of the turbine in revolutions per second, is less than the natural frequency of the blade assembly in cycles per second, the angular pivotal deflection of the blade will respond in phase with the forcing function, allowing useful work to be extracted from the air flow. Should the forcing function frequency exceed the blade assembly natural frequency, the blade assembly will begin to respond out of phase with the forcing function, transferring kinetic energy from the turbine to the air and thus reducing the turbine speed. As a result, the natural frequency of the blade assembly defines an absolute upper limit on the turbine rotation speed, regardless of turbine load and wind velocity.

In order for the turbine to be self-starting at relatively low wind speed, the blade assembly spring means must have relatively low stiffness. As a result, the mass moment of inertia of the blade assembly must also be quite low if any reasonable upper limit on rotational speed is to be achieved. Therefore, a turbine according to the invention may require blades constructed of lightweight, possibly composite materials such as plastics, fiberglass or the like.

Figure 4:
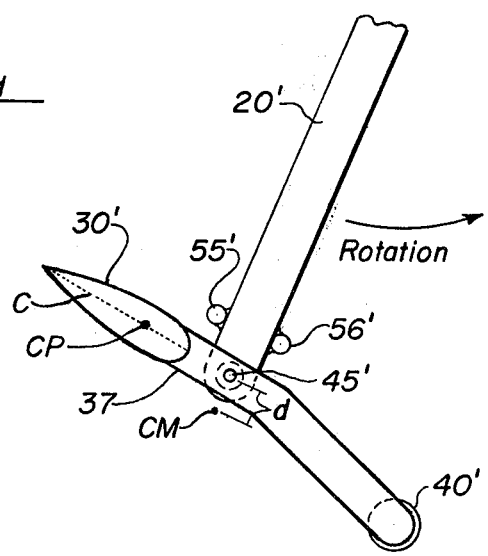
FIG. 4 is a view similar to FIG. 3, but illustrating details of an inertial type turbine according to the invention.

Turning now to FIG. 4, there is shown a blade assembly corresponding to the assembly shown in FIG. 3, but for a turbine of the inertial type. Except for the differences in blade assembly construction, the turbine of FIG. 4 is identical in all respects to the turbine of FIGS. 1 and 2. Moreover, except for two differences to be discussed hereinafter, the construction and positioning of the blade assembly of FIG. 4 are identical to those of the assembly of FIG. 3; consequently, as will be seen, like parts in both FIGS. 3 and 4 are given the same numbers, except that the numbers in FIG. 4 are primed. The two differences in blade assembly construction are as follows: First, the blade assembly does not include elastic means tending to maintain it in its undisturbed position. Second, the assembly is so constructed that its center of mass CM' is located circumferentially at the pivot axis 45' but radially some distance outboard of the pivot axis; such distance, shown as d in FIG. 4, is preferably substantially less than the distance between the rotation axis and the pivot axis but not less than about $(rg)^2/R$, where $(rg)$ is the radius of gyration of the blade assembly about its center of mass and R is the distance from the rotation axis to the pivot axis as shown in FIG. 2. Because it does not include elastic means tending to limit pivotal motion of the blade assembly, the inertial type must always include means, such as pins 55' and 56' in FIG. 4, to limit the angular pivotal deflection of the blade assembly to a predetermined angle, no greater than 90 degrees and preferably no greater than 45 degrees, from its undisturbed position.

In operation of the inertial type, the outboard center of mass of the blade assembly, when acted upon by the radial acceleration field resulting from rotation of the turbine, forms a radial pendulum having a natural frequency which is a linear function of turbine speed. Solution of the equations of motion of this type show, as a first approximation, that as long as the distance from pivot axis to center of mass is substantially less than the distance from pivot axis to rotation axis, the ratio of turbine speed in revolutions per second to natural frequency in cycles per second is a constant less than one (1), and deflection of the blade assembly will respond approximately in phase with the forcing function, allowing useful work to be extracted from the air flow. However, mathematical analysis also shows that for proper functioning of the inertial type turbine it is necessary that the distance from the pivot axis to the center of mass be not less than about $(rg)^2/R$, where $(rg)$ is the radius of gyration of the blade assembly about its center of mass and R is the distance from the rotation axis to the pivot axis; the radius of gyration of the blade assembly about its center of mass can be determined according to principles familiar to those skilled in the art.

The inertial type turbine is self-starting because of the same factors, discussed above, that make the elastic type turbine self-starting; in addition, since elastic means are not used, the inertial type can be designed to start at lower wind velocities than the elastic type and can be constructed from more conventional materials—i.e. lightweight materials may not be required. Also, of course, the need to consider fatigue life of the elastic means is eliminated in the inertial type. However, a disadvantage of the inertial type is that since the natural frequency of the radial pendulum arising during turbine rotation is a linear function of the turbine speed, and the ratio of speed to frequency is always less than one provided the pivot axis-to-center of mass distance is less than the pivot axis-to-rotation axis distance, the turbine speed can never equal the natural frequency of the assembly, with the result that the inertial type is not self-limiting with respect to maximum rotational speeds.

Although not shown in the drawing figures, I may combine features of the inertial and elastic types by providing elastic means on an inertial type. Addition of elastic means can allow predetermination of the minimum wind velocity at which rotation begins; however, the radial pendulum effects of the inertial type override the self-limiting features of the elastic type when the two are combined, so that a combination turbine is not self-limiting in speed for all practical purposes.

As will be obvious to those skilled in the art, many modifications in design and materials are possible within the requirements which I have found to be necessary for the elastic or inertial type turbines according to the invention. For example, in suitable environs turbines according to the invention can be constructed so as to be adapted for rotation about a power line pole, the pole in such case defining the rotation axis. Therefore, while I have shown and described certain present preferred embodiments of the invention, it is to be distinctly understood that the invention is not limited thereto but may be otherwise variously embodied within the scope of the following claims.

I claim:

1. A fluid turbine having a predetermined maximum permissible rotational speed comprising
   a rotation axis transverse to the direction of fluid flow,
   at least two blade assemblies spaced from and mounted for balanced rotation about the rotation axis,
   each blade assembly including an elongated blade having a streamlined cross-section and a span parallel to the rotation axis,
   each blade assembly being pivotable about a pivot axis which is parallel to and spaced from the rotation axis,
   each blade assembly being so constructed and positioned that the chord of its blade lies along a line which intersects the assembly's pivot axis and is perpendicular to a radius from the rotation axis to the pivot axis when the assembly is undistrubed,
   the pivot axis of each blade assembly being located circumferentially ahead of the center of pressure of the blade with respect to the direction of turbine rotation, and
   each blade assembly being so constructed that its center of mass is located at its pivot axis,
characterized in that
   each blade assembly includes elastic means which tend to return the assembly to its undisturbed position whenever fluid or inertial forces cause it to pivot away from such position,
   the elastic means having stiffness characteristics such that reverse flow of fluid over the blade creates a predetermined minimum fluid velocity at which turbine rotation is to begin,
   the blade assembly having a predetermind mass moment of inertia which in combination with said stiffness characteristics of said elastic means imparts to said blade assembly a natural frequency about its pivot axis in cycles per second equal to said predetermined maximum permissible rotational speed of the turbine in revolutions per second.

2. A fluid turbine as claimed in claim 1, including means limiting the angular pivotal deflection of each blade assembly to a predetermined angle, no greater than 90 degrees, from its undisturbed position.

3. A fluid turbine comprising
   a rotation axis transverse to the direction of fluid flow,
   at least two blade assemblies spaced from and mounted for balanced rotation about the rotation axis,
   each blade assembly including an elongated blade having a streamlined cross-section and a span parallel to the rotation axis,
   each blade assembly being pivotable about a pivot axis which is parallel to and spaced from the rotation axis,
   each blade assembly being so constructed and positioned that the chord of its blade lies along a line which intersects the assembly's pivot axis and is perpendicular to a radius from the rotation axis to the pivot axis when the assembly is undistrubed,
characterized in that
   the pivot axis of each blade assembly is located circumferentially ahead of the center of pressure of the blade with respect to the direction of turbine rotation,
   each blade assembly is so constructed that its center of mass is located circumferentially at its pivot axis and radially outboard of its pivot axis by a distance substantially less than the distance from the rotation axis to the pivot axis but not less than about $(r_g)^2/R$, where $(r_g)$ is the radius of gyration of the blade assembly about its center of mass and $R$ is the distance from the rotation axis to the pivot axis, and
   means are provided limiting the angular pivotal deflection of each blade assembly to a predetermined angle, no greater than 90 degrees, from its undisturbed position.

4. A fluid turbine as claimed in claim 3, further including elastic means which tend to return each blade assembly to its undisturbed position whenever fluid or inertial forces cause the blade assembly to pivot away from such position, the elastic means having stiffness characteristics such that reverse flow of fluid over a blade creates an unstable condition at a predetermined minimum fluid velocity at which turbine rotation is to begin.

5. A fluid turbine as claimed in claim 1 or 2 in which the cross-section of each blade is shaped in the form of the cross-section of an airfoil.

6. A fluid turbine as claimed in claim 5 in which the airfoil is symmetrical with respect to its chord.

7. A fluid turbine as claimed in claim 6 in which each blade has a ratio of span to chord length of about 12 to 1 and a ratio of thickness to chord length of about 1 to 8.

8. A fluid turbine as claimed in claim 7 in which the distance from the rotation axis to the pivot axis of each blade assembly is about 7.5 times the chord length of the blade.

9. A fluid turbine as claimed in claim 1 or 2 in which the cross-section of each blade is shaped in the form of the cross-section of a hydrofoil.

10. A fluid turbine as claimed in claim 9 in which the hydrofoil is symmetrical with respect to its chord.

11. A fluid turbine as claimed in claim 1 or 2, in which the pivot axis of each blade assembly is located proximately ahead of the blade's leading edge with respect to the direction of turbine rotation.

12. A fluid turbine as claimed in claim 2 including means limiting the angular pivotal deflection of each blade assembly to 45 degrees or less from its undisturbed position.

* * * * *

UNITED STATES PATENT AND TRADEMARK OFFICE
CERTIFICATE OF CORRECTION

PATENT NO. : 4,415,312

DATED : November 15, 1983

INVENTOR(S) : Ben Brenneman

It is certified that error appears in the above-identified patent and that said Letters Patent are hereby corrected as shown below:

In column 5, line 30, delete "turbin" and substitute --turbine-- therefor.

In column 7, line 59, delete "undistrubed" and substitute --undisturbed-- therefor.

Signed and Sealed this

Thirty-first Day of January 1984

[SEAL]

Attest:

GERALD J. MOSSINGHOFF

Attesting Officer

Commissioner of Patents and Trademarks